C. W. PATTERSON.
BAIT BUCKET.
APPLICATION FILED JUNE 8, 1914.
1,135,841.
Patented Apr. 13, 1915.
2 SHEETS—SHEET 1.
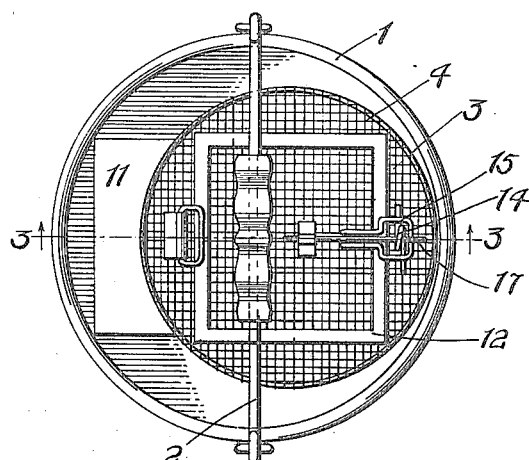
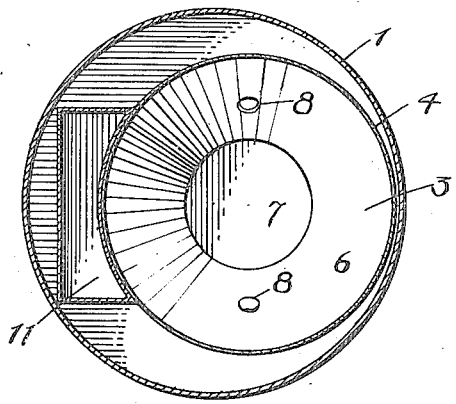
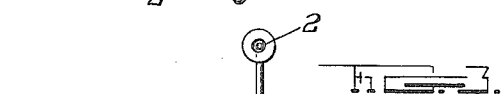
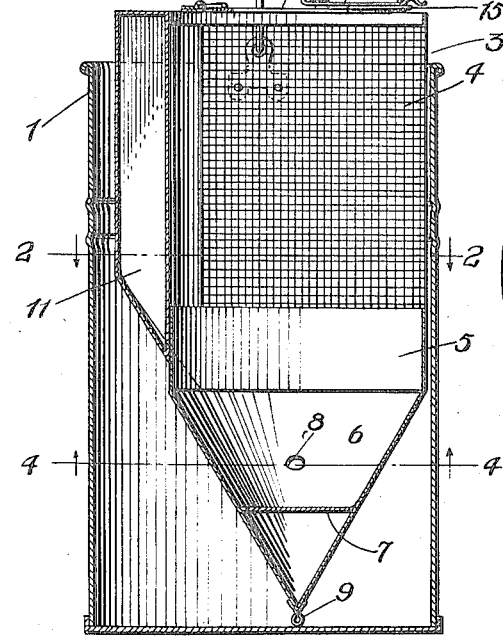
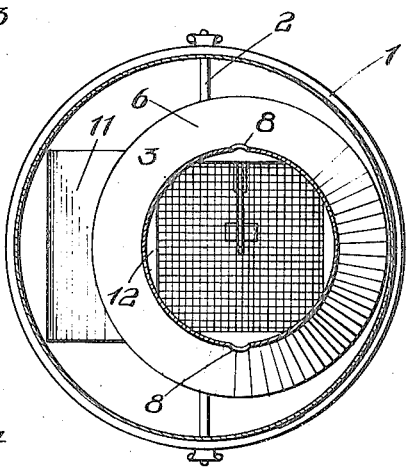
Inventor
C. W. Patterson.
Witnesses
Roland T. Booth
C. Mmutz
By H. B. Willson & Co.
Attorneys

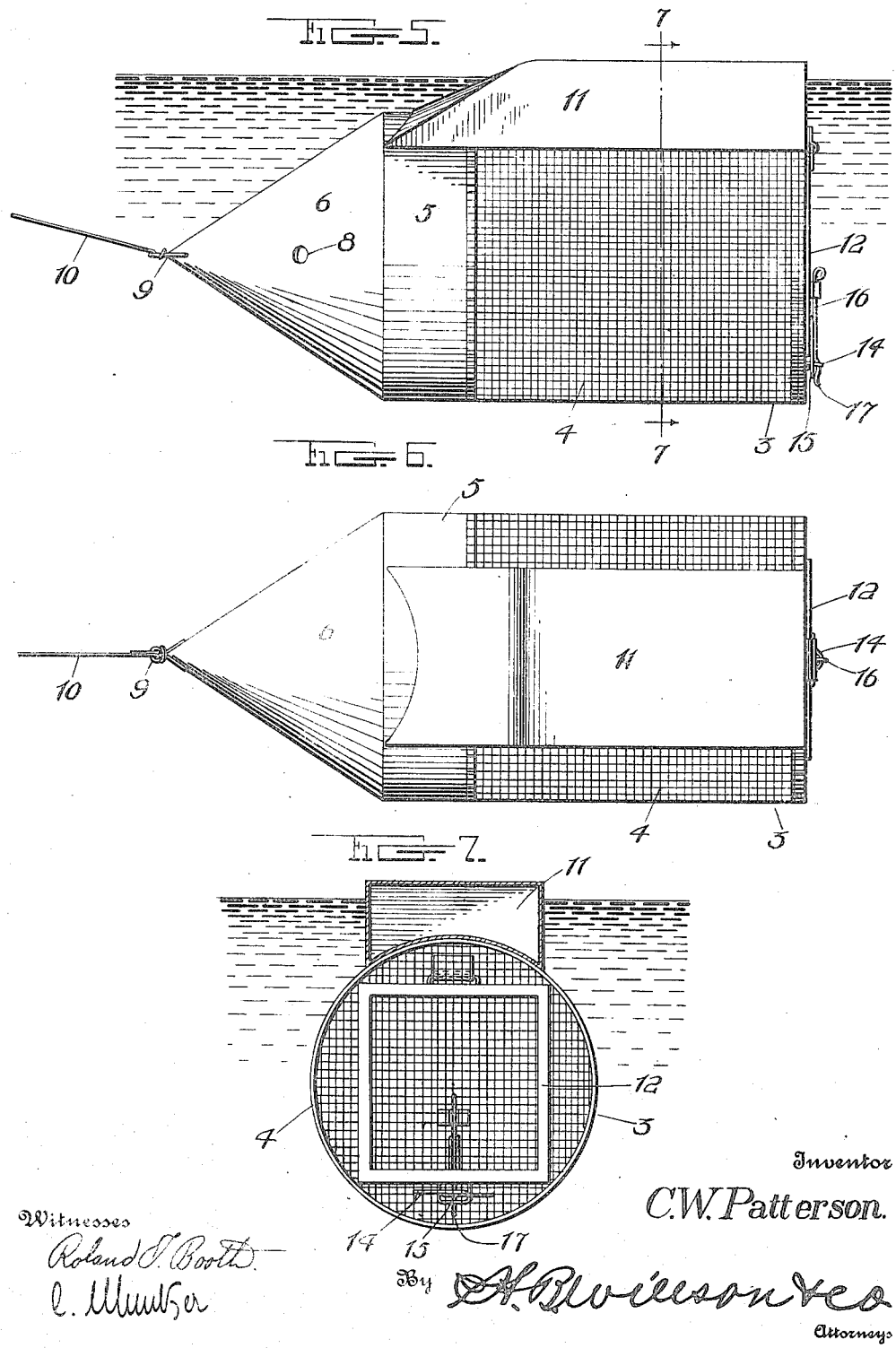

UNITED STATES PATENT OFFICE.

CLIFFORD WILLIARD PATTERSON, OF WAUKESHA, WISCONSIN.

BAIT-BUCKET.

1,135,841.

Specification of Letters Patent.

Patented Apr. 13, 1915.

Application filed June 8, 1914. Serial No. 843,721.

*To all whom it may concern:*

Be it known that I, CLIFFORD W. PATTERSON, a citizen of the United States, residing at Waukesha, in the county of Waukesha and State of Wisconsin, have invented certain new and useful Improvements in Bait-Buckets; and I do declare the following to be a full, clear, and exact description of the invention, such as will enable others skilled in the art to which it appertains to make and use the same.

This invention relates to improvements in live bait receptacles.

The object of the invention is to provide a live bait cage so constructed that it will retain its proper position at all times, which has no pull back while in the water, and which may be drawn rapidly through the water without injury to the minnows, which are the usual bait used by fishermen.

Another object is to provide a cage of this character designed to sit low in the water to prevent the wind and water from rolling it back and forth, thereby decreasing the danger of injuring the minnows.

Another object is to provide a protecting chamber for the bait during storms and squalls which is equipped with means for preventing eddies from forming at the base of the chamber, thus providing calm water in the chamber at all times.

Another object is to provide a minnow cage with means for retaining it stationary while in the bucket, thus avoiding all danger of its rising to the surface of the water therein and injuring or destroying the bait.

With these objects in view the invention consists of certain novel features of construction, combination, and arrangement of parts as will be more fully described and claimed.

In the accompanying drawings: Figure 1 represents a top plan view of this improved receptacle showing the outer bucket with the cage disposed therein ready for fishing from a dock or landing; Fig. 2 represents a transverse section on line 2—2 of Fig. 3; Fig. 3 is a central vertical section taken on line 3—3 of Fig. 1; Fig. 4 is a transverse section on line 4—4 of Fig. 3; Fig. 5 is a side elevation of the cage in operative position in the water; Fig. 6 is a top plan view thereof; and Fig. 7 is a front elevation thereof with the top air chamber shown in transverse section.

In the embodiment illustrated, a water containing receptacle is here shown in the form of an open top bucket 1 of a depth sufficient to completely house therein the cage in which the bait is designed to be confined so that sufficient water may be held in said bucket to preserve the minnows or other bait in good condition. It is obvious that these buckets and the cages carried thereby may be of any suitable or desired size according to the number of fish to be carried therein. This bucket 1 is provided with the usual bail handle 2. The cage 3 in which the minnows or other bait are designed to be confined is here shown constructed of a cylindrical member 4 composed of heavy mesh wire of sufficient strength or rigidity to retain it in position without danger of its collapse from outside forces. This cylindrical member 4 has a solid metal band 5 at one end which merges into a cone-shaped chamber 6 across the smaller end of which is disposed a partition 7 which forms an air chamber at the apex of the cone for a purpose to be described. Oppositely disposed apertures 8 are formed in the chamber which are for the purpose of admitting air thereinto when the cage is disposed cone end up in the bucket for transporting the bait and when it is submerged in a body of water, these openings 8 permit two streams of water to flow into this chamber which assists the cage in retaining its proper position while in the water and when the cage is drawn rapidly through the water, these apertures prevent swirling or eddies from forming at the base of the cone by permitting two streams of water to flow therethrough into the chamber and to relieve the air pressure therein and thus provide calm, smooth water always within said chamber. An eye 9 is secured to the apex of the cone on the outer face thereof for the purpose of securing a flexible element as 10 thereto, which is designed to connect the cage to a boat or other object.

An air chamber 11 extends longitudinally of the cylinder 4 from end to end thereof and is here shown with its inner wall concavo-convex to conform to the contour of the cylinder and forming an imperforate wall at one side thereof which constitutes the top of the cage when it is placed lengthwise in the water, said air chamber 11 together with the chamber 6 causing said cage to float in a perfectly level position at all times. By arranging these air chambers 6 and 11 as above described, one at the apex of the cone-shaped front end of the cage and the other at the top thereof, will cause the cage to remain stationary when in the bucket 1 when either up or down as hereinafter described, thus preventing all danger of the cage rising to the surface of the water and they maintain the cage level when floating.

The cone-shaped front end of the cage being made of solid material except for the apertures 8 therein and having the band 5 secured to its base, provides a protective casing for the minnows when the cage is drawn rapidly through the water and also in case of storms or squalls and the air chamber 11 at the top thereof protects them against the sun as the cage when in operation, will sit low in the water and when in this position, will be held by said chambers against rolling which would be liable to injure the bait.

In the rear end of the cage 3 is formed an opening for the insertion and removal of the bait, closed by a suitable door 12 here shown made of screen wire and hinged at one end and provided at its opposite end with a suitable locking device 13 which may be of any suitable or desired character but is here shown in the form of an eye 14 secured to the end of the cage and an interlocking eye 15 of larger size carried by the door 12 which is adapted to fit over the eye 14 when closed. To hold these parts in this position, a sliding bolt member 16 is mounted on the door in suitable keepers and is provided at its free end with an outwardly bowed portion 17 which when the device is inserted through the eye 14, will hold the door reliably in closed position against accidental opening.

The wire netting from which the cylinder 4 of the cage is constructed is preferably of about one-eighth or three-sixteenths of an inch in mesh but it may be of any other suitable or desired size, the mesh above mentioned being of a size to prevent all possibility of weeds getting into the cage and forms a foraminous or perforated receptacle for the admission of water and air.

By constructing the cage in the manner above described, it may be attached to one side or to the stern of a boat and will retain its proper position at all times and has no pull back while in the water and thus does not interfere with the rowing or steering of the boat.

When fishing from a dock or land, the cage is turned, cone end down, in the bucket 1 and will remain in this position affording quick access to the bait through the door at the opposite end thereof and fresh air is supplied to the water confined in the cone when the cage is in the bucket, through the upper end of the wire walls. When transporting the bait the cage is disposed in the bucket 1 filled nearly full of water with the cone end of the cage up and projecting above the top of the bucket. The bucket is filled to about one half inch below the holes 8 in the cone 6 and air enters the cone through these holes and tends to exert its pressure to hold the cage down in the bucket.

When the cone end of the cage is disposed downward in the bucket, the water pressure is so great that said cage is held down and it is impossible for it to rise to the surface without its being lifted up.

I claim as my invention:

1. A bait receptacle comprising a cylindrical member having one end and the side walls thereof perforated, an opening in said perforated end provided with a closure, a cone-shaped member at the other end of said cylinder communicating with the interior thereof and provided at its apex with an air chamber, and an air chamber secured to said cylinder along one side wall thereof, said air chamber projecting beyond the cylinder and the inner wall thereof conforming to the contour of the side wall of the cylinder the front end of said air chamber being inclined downwardly and forwardly.

2. A bait receptacle comprising a tubular member having perforated side walls, a cone shaped member at one end of said cylinder communicating with the interior thereof and provided at its apex with an air chamber with a bait protecting chamber at the rear thereof, and an air chamber secured to said tubular member along one side wall thereof, said air chamber being disposed entirely outside said member and having its inner wall shaped to conform to the contour of the side wall of the member to which it is applied, said air chamber projecting beyond said tubular member and being adapted to hold said member in a predetermined position.

3. The combination with a vessel open at its top, of a receptacle comprising a perforated cylinder closed at one end and having a bait protecting chamber at the other end, the side walls of said chamber having oppositely disposed apertures therein and being otherwise imperforate, said apertures serving to prevent eddies in said bait chamber when said receptacle is drawn through the water and to supply air to said receptacle when it is placed endwise in said vessel.

In testimony whereof I have hereunto set my hand in presence of two subscribing witnesses.

CLIFFORD WILLIARD PATTERSON.

Witnesses:
    CHAS. E. TRAKEL,
    OSCAR E. BACKUS.